C. F. MEILINK.
ELECTRIC WELDING.
APPLICATION FILED MAY 22, 1916.

1,312,039.

Patented Aug. 5, 1919.

Charles F Meilink
Inventor

By Geo E Kirk
Attorney

UNITED STATES PATENT OFFICE.

CHARLES F. MEILINK, OF TOLEDO, OHIO.

ELECTRIC WELDING.

1,312,039. Specification of Letters Patent. Patented Aug. 5, 1919.

Application filed May 22, 1916. Serial No. 99,026.

*To all whom it may concern:*

Be it known that I, CHARLES F. MEILINK, a citizen of the United States of America, residing at Toledo, Lucas county, Ohio, have invented new and useful Electric Welding, of which the following is a specification.

This invention relates to uniting pieces of fusible material.

This invention has utility when incorporated in apparatus for heating sheet metal.

Referring to the drawings.

Figure 1:
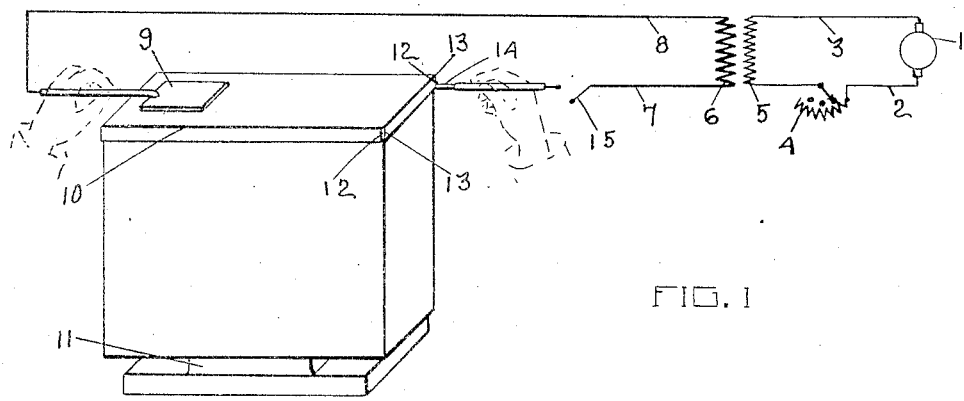
Figure 1 is a disclosure of an embodiment of the invention as adapted for use in forming union between adjacent edges of sheet steel.
Figure 2:
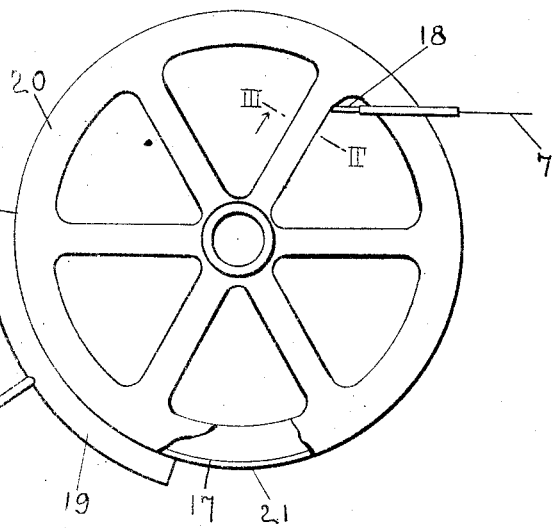
Fig. 2 is a showing of an embodiment of the invention for uniting sheet metal wheel sections.

The electric current for the welding apparatus may be supplied by the generator 1 having the leads 2, 3, past the adjustable resistance 4 to the primary 5 of the transformer having the secondary 6 from which extend the leads 7 and 8. The lead 8 may terminate in an electrode 9 of a relatively large contact area, to give a low electrical density per unit of area, thereby permitting passage of considerable electric current with avoidance of any deleterious or objectionable heating. The material to be acted upon, or the cabinet 10, may be mounted upon the insulation base 11 when ground return conductor is not used. The material may have the edges 12, 13, disposed adjacent each other to have relatively moved therealong the electrode 14 of small area and consequently relatively high electrical density per unit of area as to the electrical density per unit of area for electrode 9.

In operation, the switch 15 is closed and the electrode 14 pressed against the point of adjacency between the edges 12 and 13, and quickly moved therealong bringing the dissipated electrical charge from the material, uniformly to said edges and of increasing maximum density to the fusing or welding temperature. This uniform distribution of the charge in both elements of the material and of the same polarity, effectively concentrates the welding heat at the electrode 14 and in this operation the disposal of the electrode 9 remotely from the electrode 14 permits the use of a greater potential in the secondary or working circuit of this alternating electric current supply and accordingly insures a stability in electrode manipulation not possible with the lower heating voltages.

The distribution of the charge throughout the material uniformly up to each of the edges to be united may be of a capacity in excess of that necessary to effect the welding at the concentration and still be of a density in no wise objectionably effecting the material away from the region for union. This is a comparison of the voltage drop in the work with the voltage drop at the weld. For instance, upon ten gage sheet steel a twenty volt pressure may be used very conveniently with a three foot range for the low density electrode 9 away from the working electrode 14. The twenty volt-pressure is an operating voltage through the weld and the work. However, even at this voltage the spacing may be shortened to say 8 inches and still working conditions be practical, but the longer range is preferred.

With twenty gage stock the twenty volt pressure at a distance of three feet may be operated more rapidly, and, while a two volt pressure can be operated on the twenty gage, it is not practical herein to be used in a range distance in the ten gage stock. Accordingly the two volts pressure is here considered as a weld voltage drop.

Figure 3:
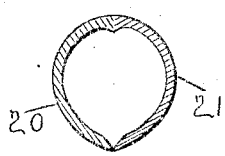
Fig. 3 is a section on the line III—III Fig. 2.

The seam closure of the edges 12, 13, as well as the edges 16, 17, may be desirably effected by having these edges abut each other at an angle, and, with the progress of the working electrode 14 and 18 thereover, flatten and unite these edges into desired finished configuration. This seaming closure or uniting of the elements of the weld of Fig. 3 may have the current distributing electrode 19 remotely disposed in coacting relation with each of the pieces 20 and 21 entering into the weld unit by flash weld progressing along edges to form a seam, or by spot welding at spaced points in such other work as it may answer as along the sides of the cabinet 10.

What is claimed and it is desired to secure by United States Letters Patent is:

1. The process of electric welding which consists in applying a voltage to the work greatly in excess of that required to effect the weld, and dissipating the excess voltage in the work between the contacting welding electrode and a remote non-welding contacting electrode.

2. The process of electric welding sheet metal which consists in applying an alternating electric current voltage to the work greatly in excess of that required to effect the weld, and dissipating the excess voltage in the sheet metal between the contacting welding electrode and a non-welding contacting electrode laterally spaced along the work remote from the weld.

3. The process of electric welding sheet metal which consists in thinning the edges of the sheet metal adjacent the weld, applying an alternating electric current voltage to the work greatly in excess of that required to effect the weld and dissipating the excess voltage in the sheet metal between the welding electrode pressed to flatten the thinned edges of the work adjacent the weld and a remote non-welding contacting electrode.

In witness whereof I affix my signature.

CHARLES F. MEILINK.